INVENTOR.
HOWARD D. HERN
BY Moody and Goldman
ATTORNEYS

Jan. 24, 1961　　　　H. D. HERN　　　　2,969,459

METHOD AND MEANS FOR REDUCING THE THRESHOLD OF ANGULAR-MODULATION RECEIVERS

Filed Nov. 14, 1957　　　　7 Sheets-Sheet 2

INVENTOR.
HOWARD D. HERN
BY Moody and Goldman
ATTORNEYS

Jan. 24, 1961 H. D. HERN 2,969,459

METHOD AND MEANS FOR REDUCING THE THRESHOLD OF ANGULAR-MODULATION RECEIVERS

Filed Nov. 14, 1957 7 Sheets-Sheet 3

INVENTOR.
HOWARD D. HERN
BY Moody and Goldman
ATTORNEYS

Jan. 24, 1961 H. D. HERN 2,969,459

METHOD AND MEANS FOR REDUCING THE THRESHOLD OF ANGULAR-MODULATION RECEIVERS

Filed Nov. 14, 1957 7 Sheets-Sheet 4

INVENTOR.
HOWARD D. HERN
BY Moody and Goldman
ATTORNEYS

Jan. 24, 1961 H. D. HERN 2,969,459

METHOD AND MEANS FOR REDUCING THE THRESHOLD OF ANGULAR-MODULATION RECEIVERS

Filed Nov. 14, 1957 7 Sheets-Sheet 5

INVENTOR.
HOWARD D. HERN
BY Moody and Goldman
ATTORNEYS

Jan. 24, 1961 H. D. HERN 2,969,459

METHOD AND MEANS FOR REDUCING THE THRESHOLD OF ANGULAR-MODULATION RECEIVERS

Filed Nov. 14, 1957 7 Sheets-Sheet 6

INVENTOR.
HOWARD D. HERN
BY Moody and Goldman
ATTORNEYS

INVENTOR.
HOWARD D. HERN
BY Moody and Goldman
ATTORNEYS

United States Patent Office 2,969,459

Patented Jan. 24, 1961

2,969,459

METHOD AND MEANS FOR REDUCING THE THRESHOLD OF ANGULAR-MODULATION RECEIVERS

Howard D. Hern, Cedar Rapids, Iowa, assignor to Collins Radio Company, Cedar Rapids, Iowa, a corporation of Iowa Filed Nov. 14, 1957, Ser. No. 696,473

10 Claims. (Cl. 250—20)

This invention relates to a method, and to the various means comprehended within the method, for lowering the input-threshold level of a receiver of angularly-modulated signals. Frequency-modulated (F.M.) signals, phase-modulated (P.M.) signals, and signals having combinations of these two modulations are comprehended herein within the term, angularly-modulated signals.

Conventionally, angular-modulation receivers include limiters to remove amplitude variations of a received signal before detection of the angular modulation. Limiting assures that angular-modulation detection is not influenced by amplitude variations, which may be due to noise, fading, or transmitter-output variations, for example.

Amplitude limiters enable a unique characteristic in angular-modulation receivers by permitting "capture" of a received wave having the largest peak amplitude, thereby greatly decreasing the reception of other lesser-peak amplitude waves falling within or without the receiver's bandpass. Accordingly, for a limiter to "capture" a continuous sinewave signal rather than Gaussian noise, the former must be at least equal in peak value to the latter. This results in a signal-to-noise power ratio between them of about ten decibels, since the root-mean-square value of the noise is much smaller than that of the sine wave under these conditions. Hence, ten decibels is the "limiter-threshold signal-to-noise ratio."

The word, threshold, is also used herein with several other connotations. "Limiter-threshold level" is that signal amplitude at the limiter input which provides the "limiter-threshold signal-to-noise ratio." "Receiver-input-threshold level" is that signal amplitude at the input to the receiver (such as obtained from an antenna) required to provide the "limiter-threshold level."

Once the actual signal-to-noise ratio at the limiter input falls below the ten decibel "limiter-threshold signal-to-noise ratio," the "capture" effect of the signal is lost; and the signal-to-noise ratio at the output of the receiver quickly falls toward zero, making the signal undetectable. Furthermore, if the receiver-input amplitude of the angularly-modulated signal falls below the "receiver-input-threshold level," the input to the limiter consequently falls below the "limiter-threshold level"; and the message carried by the angularly-modulated signal becomes uncapturable and undetectable.

In order to better understand this invention, the overall receiver output signal-to-noise ratio $$\frac{s}{n_{out}}$$

is considered as comprised of two component ratios:

(1) $$\left(\frac{s}{n}\right)_{out\,n}$$

which is based only on receiver-generated noise, and (2) $$\left(\frac{s}{n}\right)_{out\,p}$$

which is based only upon receiver-generated distortion caused by bandpass restrictions, and such distortion is hereafter referred to as intermodulation distortion.

The component signal-to-noise ratio $$\left(\frac{s}{n}\right)_{out\,n}$$

can be expressed as follows:

$$\left(\frac{s}{n}\right)_{out\,n}\text{(decibels)}=10\text{ Log }H+10\text{ Log }S+10\text{ Log }\frac{B_{if}D^2}{2B_d} \quad (1)$$

where H is the limiter-threshold signal amplitude that makes 10 Log $H$ equal to ten decibels, S is that portion of the total receiver-input signal which exceeds the "receiver-input-threshold level," $B_{if}$ is the receiver bandwidth presented to the angularly-modulated signal, $B_d$ is the maximum bandwidth of the detectable message carried by the received signal, and D is the deviation ratio of the received signal.

Furthermore, the above-threshold portion S of the total receiver-input signal, designated as X, can be expressed in the following manner:

$$10\text{ Log }S=10\text{ Log }\frac{X}{X_1} \quad (2)$$

where $X_1$ is the "receiver-input-threshold level."

Also, it can be shown that:

$$10\text{ Log }X_1=10\text{ Log}(KTB_{if})+10\text{ Log }(F_n)+10\text{ Log }H \quad (3)$$

where K is Boltzmann's constant, T is absolute temperature, $B_{if}$ is the intermediate-frequency bandwidth and is a close approximation to the receiver's noise bandwidth which is the quantity actually represented by this factor, and $F_n$ is the noise-figure ratio of the receiver.

Substituting Expression 3 into 2 the following is obtained:

$$10\text{ Log }S=10\text{ Log }\frac{X}{HKTB_{if}F_n} \quad (4)$$

And, Expression 4 may be substituted into 1 to provide the following:

$$\left(\frac{s}{n}\right)_{out\,n}\text{(decibels)}=10\text{ Log }\frac{XD^2}{2KTF_nB_d} \quad (5)$$

It is noted that receiver bandwidth, $B_{if}$, cancels out of Expression 5. Therefore, above threshold, the component output signal-to-noise ratio, $$\left(\frac{s}{n}\right)_{out\,n}$$

varies directly with receiver-input amplitude, X, but is not affected by variations in receiver bandwidth $B_{if}$.

Furthermore, Expression 3 above can be written as follows:

$$X_1=(KTF_nH)B_{if}=C_1B_{if} \quad (6)$$

$$B_{if}=\left(\frac{1}{C_1}\right)X_1 \quad (7)$$

where $C_1$ is a constant equaling $KTF_nH$. Accordingly, the threshold (critical) bandwidth $B_{if}$ in Equation 7 varies linearly with the receiver-input-threshold level, $X_1$. It should be understood that $B_{if}$ in Expression 7 is not necessarily the actual bandwidth of a receiver but merely the bandwidth it must have if it is to capture a signal level which exceeds the threshold level $X_1$ corresponding to the given value of $B_{if}$.

In order to enable a signal to be "captured," it is essential that the peak level of the receiver's input-signal amplitude, X, exceed the "receiver-input-threshold level," specified as $X_1$, which is determined by internally-generated front-end noise, R.F. amplification before limiting, and receiver bandwidth for the signal.

In the conventional receiver having a fixed bandpass, input threshold $X_1$ is fixed at a value, $X_0$.

It is the primary purpose of this invention to teach how the input-threshold level, $X_1$, of an angular-modulation receiver can be decreased below $X_0$ to enable the receiver to capture small input signals which it could not otherwise detect. Stated in other words, it is the primary purpose of this invention to teach how a P.M. or F.M. receiver can be made to capture smaller levels of received-input signal than can be captured by any other type of P.M. or F.M. receiver system presently known.

The invention accomplishes its purpose by making the receiver-input-threshold level, $X_1$, variable by decreasing the receiver's radio-frequency (including intermediate-frequency) filtered bandwidth to or below a threshold bandwidth, taught herein, when the amplitude of the receiver-input signal falls below its "normal-threshold level," $X_0$. Thus, as the input-signal level varies below normal threshold, the invention varies the receiver bandwidth to maintain it at or below the critical amount taught herein; which varies and maintains the receiver-input-threshold level at or below the received-signal amplitude so that capture and detection of the signal are enabled.

Because of intermodulation distortion, it is generally preferable to operate a receiver with as wide a bandwidth as possible. The component intermodulation-distortion ratio $$\left(\frac{s}{n}\right)_{\substack{\text{out}\\p}}$$

is generally small compared to the component receiver-noise ratio $$\left(\frac{s}{n}\right)_{\substack{\text{out}\\n}}$$

when full-receiver bandwidth is utilized. When the input signal, X, exceeds the "normal-threshold level," $X_0$, the invention can maintain maximum receiver bandwidth so that intermodulation distortion is made insignificant. However, when input level X falls below normal threshold, $X_0$, the invention enables the signal to be captured by decreasing the bandwidth by an amount between a critical threshold bandwidth and a minimum intelligible bandwidth of twice the message bandwidth. Hence, to minimize intermodulation distortion, it is generally preferable to regulate the R.F. bandwidth as close to the threshold bandwidth as receiver stability considerations permit. Stability is enhanced by maintaining receiver bandwidth below rather than at the critical threshold bandwidth. Therefore, some preferable forms of the invention closely regulate close bandwidth by continuous surveillance of the receiver-input signal level.

If much intermodulation distortion can be tolerated in a given type of receiver in a choice between reception or no reception of the signal, the bandwidth provided by the invention can immediately be dropped to a minimum value when the input level falls below $X_0$. This is because the component output signal-to-noise ratio $$\left(\frac{s}{n}\right)_{\substack{\text{out}\\n}}$$

is not affected by receiver-bandpass changes, as proven by Expression 5 above; and it is quantities contributing to the component ratio $$\left(\frac{s}{n}\right)_{\substack{\text{out}\\n}}$$

that control the "capture" of the input signal, and not the amount of intermodulation distortion.

A large amount of bandwidth narrowing can be tolerated in many F.M. receiver systems before the intermodulation-distortion ratio $$\left(\frac{s}{n}\right)_{\substack{\text{out}\\p}}$$

falls to the same order as the receiver-noise ratio $$\left(\frac{s}{n}\right)_{\substack{\text{out}\\n}}$$

Accordingly, the invention generally allows a large decrease in receiver R.F. bandwidth below its normal bandwidth to provide a relatively large decrease in receiver-input-threshold level before intermodulation distortion becomes excessive. Consequently, the permissible amount of receiver-bandwidth narrowing is dependent upon the amount of intermodulation distortion that is tolerable with a particular type of angular-modulation receiver.

This invention is not to be confused with other bandwidth control schemes for F.M. receivers which vary I.F. bandwidth as a function of instantaneous frequency-deviation of the received signal. Such conventional schemes generally control their receiver bandpass with the amplitude of their frequency-discriminator output, which is proportional to instantaneous frequency-deviation. Such schemes are basically different from this invention, because they do not control R.F. (I.F.) bandwidth by means of the receiver-input R.F. level, which is basic to this invention. It must be realized that there is no relationship between receiver input-signal amplitude, on the one hand, and frequency-deviation, on the other hand. In other words, this invention is not concerned with bandpass variation by means of the frequency-deviation of the incoming signal; and this is made apparent by the following: The invention decreases receiver bandwidth only when there is sufficient decrease in receiver-input level; and during such decreased input level and bandwidth, the signal's instantaneous frequency-deviation can be large, small, minimum, or maximum. On the other hand, in the conventional arrangement, receiver bandwidth must be maximum when frequency deviation is maximum, which can (and probably will) occur when the signal is below normal threshold.

Further objects, features and advantages of this invention will be apparent to a person skilled in the art upon further study of the specification and accompanying drawings in which:

Figures 1, 2, 3, and 4 illustrate various forms of the invention;

Figure 1:
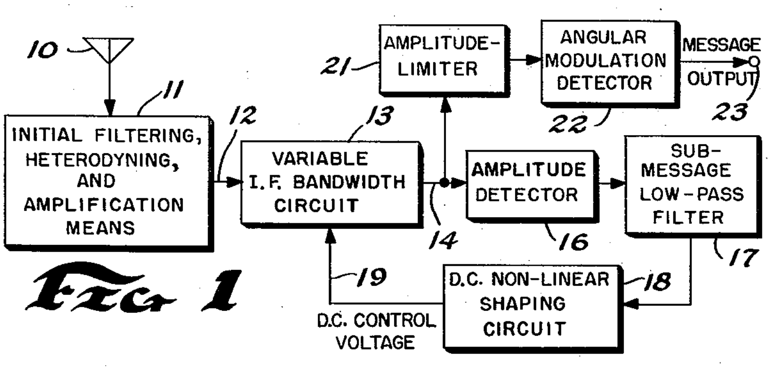

The accompanying drawings are now considered in detail. Figure 1 shows an antenna 10 which receives an angularly-modulated signal. The signal output of antenna 10 is provided to the conventional front-end portion 11 of an angular-modulation receiver. Item 11 represents the initial filtering, heterodyning and amplification means of the receiver. Initial means 11 provides an angularly-modulated output signal 12 in an intermediate-frequency range, with output signal 12 having a fixed-amplitude ratio to its incoming signal from antenna 10. Hence, item 11 has the usual intermediate-frequency filters which are sufficiently broad-band not to cause substantial intermodulation distortion.

A variable-bandwidth circuit 13 receives the intermediate-frequency output signal 12 from initial-receiving means 11. Circuit 13 is normally operated with maximum bandwidth when the signal output, X, of antenna 10 is above the receiver's normal-threshold level, $X_0$. However, when the antenna signal falls below normal threshold, $X_0$, the bandwidth of circuit 13 decreases with the signal level, X, although not generally with proportionality due to factors hereafter explained. The output signal 14 of circuit 13 is passed to an amplitude limiter 21 and then to a conventional angular-modulation detector, such as a frequency-modulation discriminator which detects the message carried by the received signal and provides a message output at terminal 23.

The amplitude level of the incoming radio-frequency signal is sensed by an amplitude detector 16 prior to or simultaneous with it being amplitude limited. In Figure 1, amplitude detector 16 is connected to the output of circuit 13. Bandwidth variation by circuit 13 does not change the average amplitude level of the filter output because virtually all of the largest-amplitude components of the signal spectrum will be within the minimum band-pass of circuit 13.

A submessage low-pass filter 17 receives the output of detector 16 and removes high-frequency variations from the detector output signal. The cutoff frequency of filter 17 is at least as high as the rate at which the incoming signal is varying in amplitude, which is often determined by propagation conditions. As an example, in tropospheric-scatter diversity-receiver arrangements, the maximum fading rate is generally below about 30 cycles-per-second. Accordingly, in diversity receivers, filter 17 may have a cutoff frequency of about thirty cycles-per-second. Nevertheless, the cutoff frequency is preferably below the lowest message frequency of the received signal.

The output of filter 17 is a direct-current signal proportional to the average amplitude of the received signal over a relatively long period of time that is determined by the time constant of the filter. As a result, the output of filter 17 is controlled more by signal than by noise when the signal has equal or greater peak amplitude than the noise, because of the greater average value of signal than noise when they have the same peak values.

A direct-current shaping circuit 18 receives the output of filter 17 and modifies it in a nonlinear manner. Such direct-current shaping circuits are well-known and vary their resistance as a function of input direct-current amplitude. They comprise resistors and asymmetric conductors arranged so that at various amplitudes of input voltage, the asymmetric conductors open, or close, or change their resistance to the input current. Accordingly, the output control-voltage 19 of circuit 18 varies in a nonlinear manner to correspondingly vary the bandwidth of circuit 13 as a function of receiver-input-amplitude level. An illustrated shaping characteristic for circuit 18 is given in Figures 9 and 10 and is explained below in connection with the circuit of Figure 8.

Figure 2:
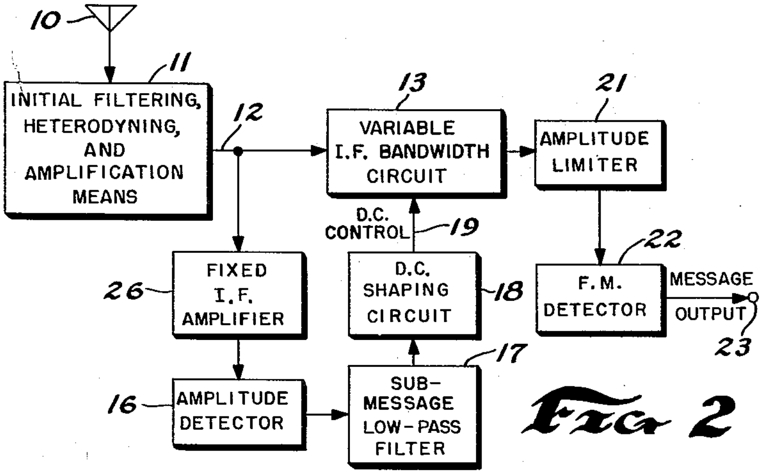

Figure 2 shows a modified form of the invention; but it differs from Figure 1 only in that the R.F. signal is sensed at the input to variable-bandwidth circuit 13, rather than at its output as was done in Figure 1. Sensing of R.F. amplitude may be done in either manner since the signal amplitude is not substantially affected by bandwidth variation of circuit 13. The technique of Figure 2 is preferable only where circuit 13 is passive. However, where the signal is amplified in circuit 13, the system of Figure 1 is preferable, since a higher signal level is then obtainable at its output.

In Figure 2, an additional amplifier 26 is connected to receive signal 12. For simplicity, amplifier 26 has a fixed I.F. bandwidth, and its output amplitude is sensed by detector 16, filtered by low-pass filter 17, and shaped by means 18 to provide a direct-current voltage 19 to control variable-bandwidth circuit 13 as was done in Figure 1. Items 16, 17 and 18 respectively can be the same in each of the figures.

Figure 3:
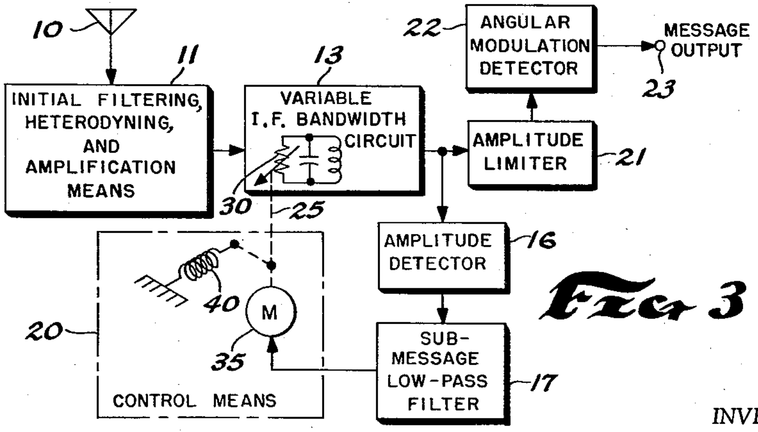

The receiver system of Figure 3 provides another form of the invention. The items illustrated in Figure 3 are similar to the items in Figure 1 except for control means 20 and nonlinear resistance means 30, which replace circuit 18. In Figure 3, the bandwidth of circuit 13 is varied by rotating a mechanical control shaft 25; and circuit 13 may include a variable-resistance 30 across each of its tuned circuits, of which one is illustratively shown. Such resistance means 30 can be a potentiometer, or a tap switch having resistors respectively connected between the stator contacts so that an incrementally-variable resistance means 30 is provided. The variation of the resistance of means 30 with rotation of shaft 25 is nonlinear in a similar manner to the nonlinearity of shaping circuit 18 in Figures 1 and 2 and also is made to follow a curve, such as curve 82 in Figure 10, wherein the shaft-rotation angle replaces the direct-current input on the abscissa. The amount of angular rotation by shaft 25 is made a function of the output level from filter 17 and may be a linear function for simplicity, with the nonlinearity being provided by resistance means 30. Such operation is provided by a motor 35 which has its output shaft torsionally-restrained by a spring 40. Thus, the amount of output rotation of motor shaft 25 is proportional to the amplitude of the direct-current input signal. A small motor 35 can operate through a gear box (not shown) for torque multiplication before being restrained by spring 40, if required.

Thus, the system of Figure 3 operates basically in the same manner as the system of Figure 1 except that the resistance means variation has a nonlinearity which corresponds to the nonlinearity provided by shaping circuit 18 in cooperation with any other internal nonlinearities of bandwidth variation by circuit 13 in Figures 1 or 2.

Figure 4:
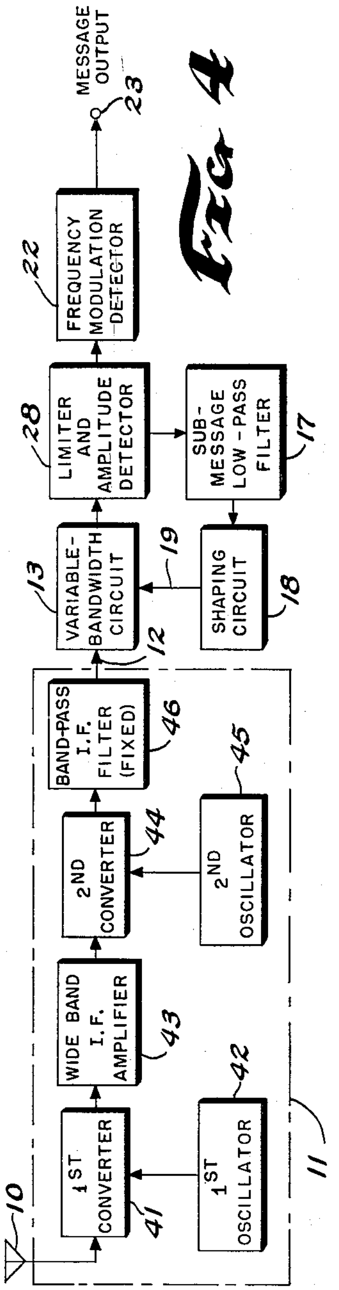

The form of the invention in Figure 4 is similar to that of Figure 1, except that in Figure 4 the receiver amplitude-limiter 28 is also utilized as the amplitude-detecting device of the invention. The clipping properties of an amplitude-limiter make it also usable as an amplitude detector since the clipped-voltage peaks are not transmitted to the angular-modulation detector.

Also, in Figure 4, a detailed form of conventional initial-receiver means 11 is illustrated. It includes a first frequency converter 41 connected to antenna 10 and to a first oscillator 42 to heterodyne the signal down to a frequency range that is passed by a first wide-band amplifier 43. A second converter 44 receives the signal from amplifier 43 and receives the output of a second oscillator 45 to heterodyne the signal down to a fixed intermediate-frequency range passed through a fixed I.F. filter 46 that is broad-band by the conventional amount. The output of filter 46 is provided to the input of variable-bandwidth circuit 13.

Figures 11, 12, 13, 14:
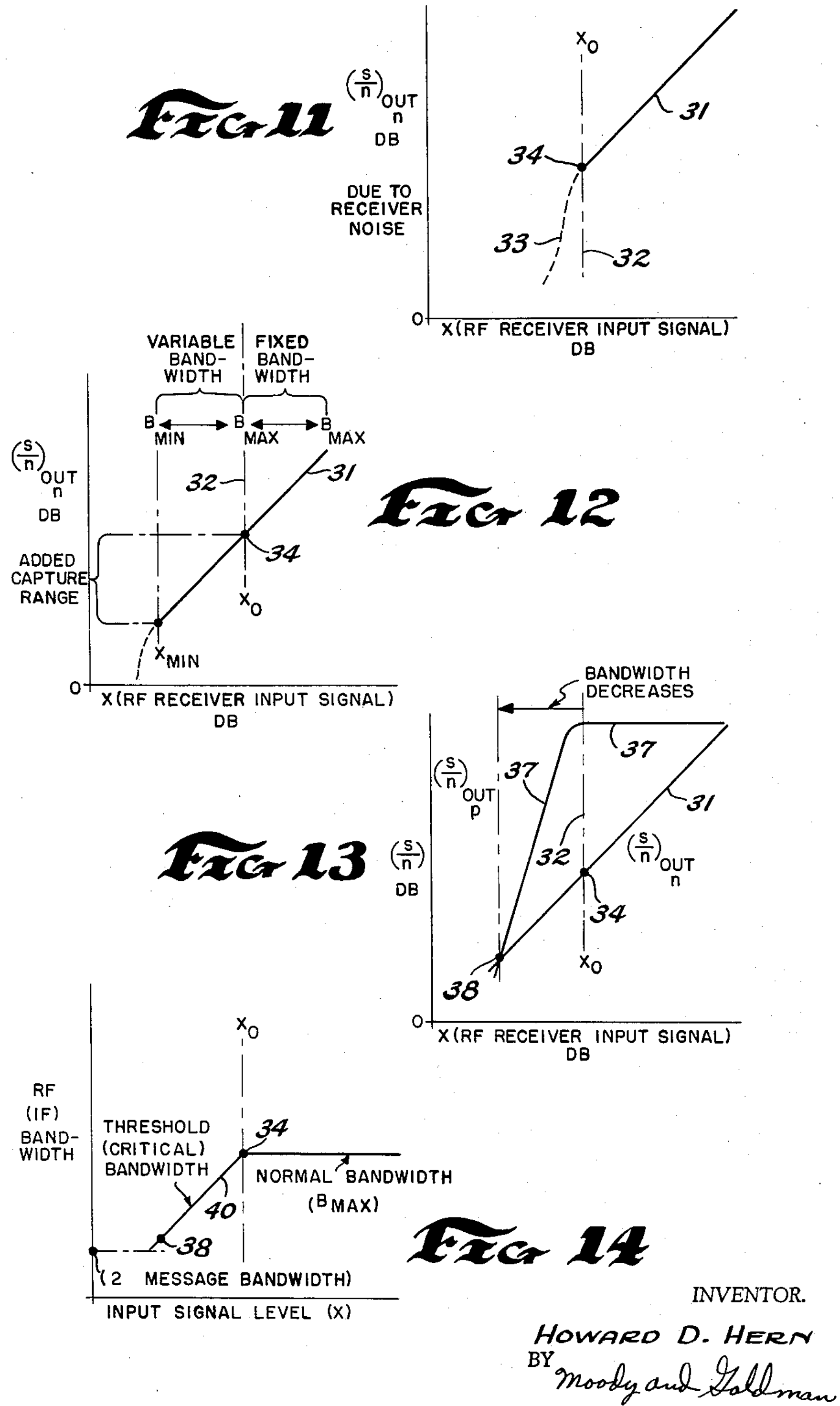

The operation of all of the forms of the invention shown in Figures 1, 2, 3, and 4 can be explained with the assistance of the diagrams in Figures 9 through 14. It will be reiterated at this point that the problem with which the invention is directly concerned is how to capture a small angularly-modulated signal in the presence of noise, which is primarily generated in the input stages of a receiver due to thermal agitation and shot noise. Such noise is generally Gaussian in distribution and therefore random. The average amplitude of noise generated in a receiver is relatively constant, if the ambient temperature is assumed to be relatively constant, and it is the signal that fluctuates, due primarily to propagation-fading conditions. Also, as noted from Expression 5 above, the output component signal-to-noise ratio $$\left(\frac{s}{n}\right)_{\text{out}_n}$$

due to receiver noise, varies linearly with the receiver input signal level X, as illustrated by line 31 in Figure 11, when the quantities are expressed in decibel units. This is true only as long as the signal has sufficient amplitude to be captured by the limiter, which can be done in conventional receivers only as long as the signal exceeds the normal-receiver-input-threshold level $X_0$, represented by vertical line 32. When the signal falls below threshold level, $X_0$, the conventional receiver output component signal-to-noise ratio $$\left(\frac{s}{n}\right)_{\substack{\text{out}\\ n}}$$

quickly approaches zero, as is illustrated by the unstable dashed line 33 in Figure 11.

Figure 12 illustrates how the invention extends the receiver capture range to input-signal levels below the normal-threshold level, $X_0$, thus enabling reception of input-signal levels between $X_0$ and $X_{min}$, which could not be received with a conventionally designed receiver having threshold level $X_0$. Figure 12 also illustrates the bandwidth variations of the invention. The normal-receiver bandwidth, $B_{max}$, is used when the input-signal level exceeds normal-threshold level, $X_0$. However, when the R.F. signal level decreases below normal-threshold level $X_0$, the bandwidth simultaneously decreases. Point 34 on line 31 in Figure 12 is the same as point 34 in Figure 11. Figure 14 illustrates the variation of a receiver's critical bandwidth when its input signal falls below normal-threshold level, $X_0$. A linear variation exists between the threshold bandwidth and the input threshold, $X_1$, when the input signal X is below normal threshold $X_0$, as is illustrated by line 40 in Figure 14. Consequently, the receiver's threshold bandwidth varies when the signal is below normal-threshold, $X_0$. Hence, as input-signal level X is decreased below point 34, the receiver bandwidth is decreased to or below the threshold bandwidth which provides a corresponding input-threshold level $X_1$ that is at or below the existing input-signal level, respectively. Finally, when the signal level decreases to a value $X_{min}$, the bandwidth has been decreased to its minimum value $B_{min}$ for a given type of receiver; and further decreases in input signal amplitude are below threshold.

As the above-threshold signal level decreases, the output signal-to-noise ratio also decreases proportionally in decibels. However, the signal is still captured by the limiter and is detectable at the output, which could not otherwise have been done for the signal range between $X_0$ and $X_{min}$.

The theoretical minimum bandwith for circuit 13 is twice the message bandwidth, that is twice the bandwidth of the detectable signal (modulating signal), because below that bandwidth it is theoretically impossible to maintain a spectrum having sufficient information content to be representative of the carried message.

In particular cases, there will be other controlling limitations on the minimum permissible bandwidth. Thus, some bandwidth compression circuits are incapable of a large compression range, and where used will limit the minimum bandwidth and accordingly the minimum detectable output signal-to-noise ratio. A more important minimum bandwidth limitation is the maximum amount of allowable intermodulation distortion for a particular receiver, since the intermodulation distortion increases as the bandwidth is narrowed. Thus, in multi-channel F.M. receivers, the maximum permissible phase-intermodulation distortion may be when it generates audible cross-talk. In such case, the minimum permissible bandwidth is obtained when cross-talk becomes audible.

Figure 13 illustrates how a compromise situation can be obtained between intermodulation-distortion degradation $$\left(\frac{s}{n}\right)_{\substack{\text{out}\\ p}}$$

on the one hand, and receiver-noise degradation $$\left(\frac{s}{n}\right)_{\substack{\text{out}\\ n}}$$

on the other hand, as input-signal level changes affect the receiver bandwidth in the invention. With many F.M. receivers, it is the over-all degradation of the signal from all causes that is important; and it is the smaller of component signal-to-noise ratios which is controlling in regard to the over-all signal-to-noise ratio at the receiver output. In Figure 13, line 31 again represents the component ratio $$\left(\frac{s}{n}\right)_{\substack{\text{out}\\ n}}$$

Curve 37 is added to represent the component receiver output ratio $$\left(\frac{s}{n}\right)_{\substack{\text{out}\\ p}}$$

which only considers intermodulation distortion as the source of noise. Normal-input-threshold line 32 represents the input-signal level at which the bandwidth begins to decrease as the signal-level X decreases. It is noted that curve 37 remains constant as long as the bandwidth is not changed, since the intermodulation distortion is not then changed. However, as soon as the bandwidth begins decreasing, the intermodulation distortion begins increasing due largely to the increase in the denominator value of $$\left(\frac{s}{n}\right)_{\substack{\text{out}\\ p}}$$

as is illustrated by curve 37 on the left hand side of threshold 32 in Figure 13. Throughout the decrease in input signal X from point 34 to point 38, the degradation in the over-all output signal-to-noise ratio due to its intermodulation-distortion component is less than degradation caused by receiver noise, until the signal falls to the level of point 38, where the component ratios become equal. Thus, when the input-signal level X falls below point 38, the output signal-to-noise ratio of the receiver is degraded more by intermodulation distortion than by receiver noise. In many cases, the signal level at point 38 determines the minimum bandwidth that should be provided in particular applications of the invention. Hence, in some F.M. multiplex systems having a very large number of channels, audible cross-talk must be avoided; and bandwidth compression then has its minimum value occur at a somewhat higher receiver-input level than given by point 38. On the other hand, in single-channel receivers and in multiplex systems where reception of a message is more important than a small amount of cross-talk, it is possible to have a smaller minimum bandwidth that can operate to signal levels below point 38, since the received signal can still be intelligible even though degraded.

Figure 5:
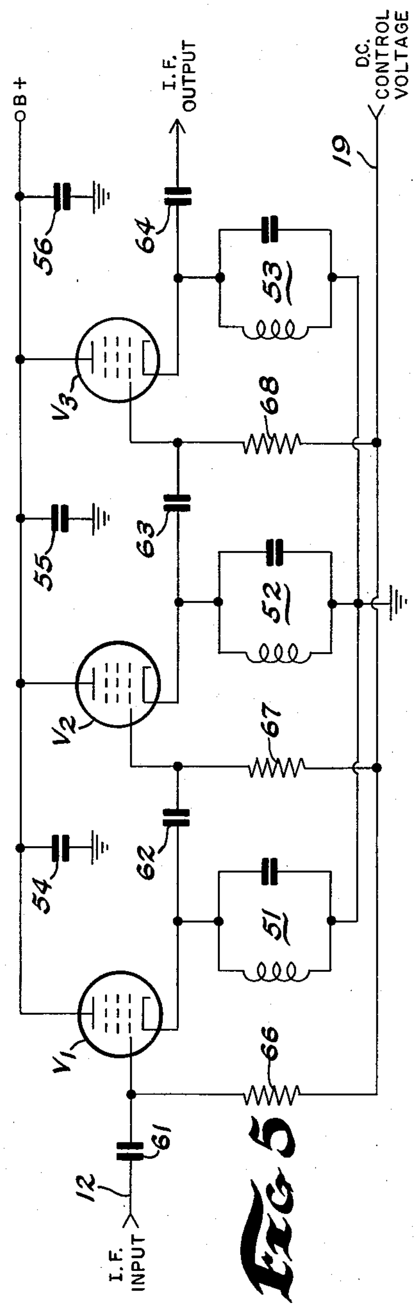
Figure 5 shows a type of bandwidth-control circuit which can be used in the invention.

Figure 5 illustrates one type of variable-bandwidth circuit, which is controlled by direct-current from lead 19. Many other variable-bandwidth circuits are known in the art. In Figure 5, there is shown a series of L–C tank circuits 51, 52 and 53, which are connected in tandem by means of cathode-follower connected tubes $V_1$, $V_2$ and $V_3$, which have their plates all connected to a common B+ source with conventional isolation capacitors 54, 55 and 56 provided. The cathode followers are tandem coupled R.F.-wise to I.F. source 12 through blocking capacitors 61, 62, 63 and 64. The tank circuits are respectively connected between ground and the cathodes of the tubes. Thus, the intermediate-frequency output of initial receiving means 11 in any of Figures 1, 2 or 4 is provided to the grid of tube $V_1$. The direct-current control voltage from lead 19 is provided to the grids of tubes $V_1$, $V_2$ and $V_3$ through respective grid-leak resistors 66, 67 and 68.

Tank circuits 51, 52 and 53 each have their center frequencies tuned to the carrier frequency of the I.F. angularly-modulated wave. The bandwidth of the circuit in Figure 5 will be determined by the composite Q's of its tank circuits, which will depend upon their resistance loading; and their resistance loading is a function of the output resistance of their respective cathode-follower, which is inversely proportional to the transconductance ($g_m$) of its tube. Thus, the over-all bandwidth is determined by the composite transconductances of tubes $V_1$, $V_2$ and $V_3$. These tubes are preferably of the so-called vary-Mu type, wherein the transconductance is permitted a wide variation with respect to direct-current bias provided from lead 19.

Figures 8, 9, 10:
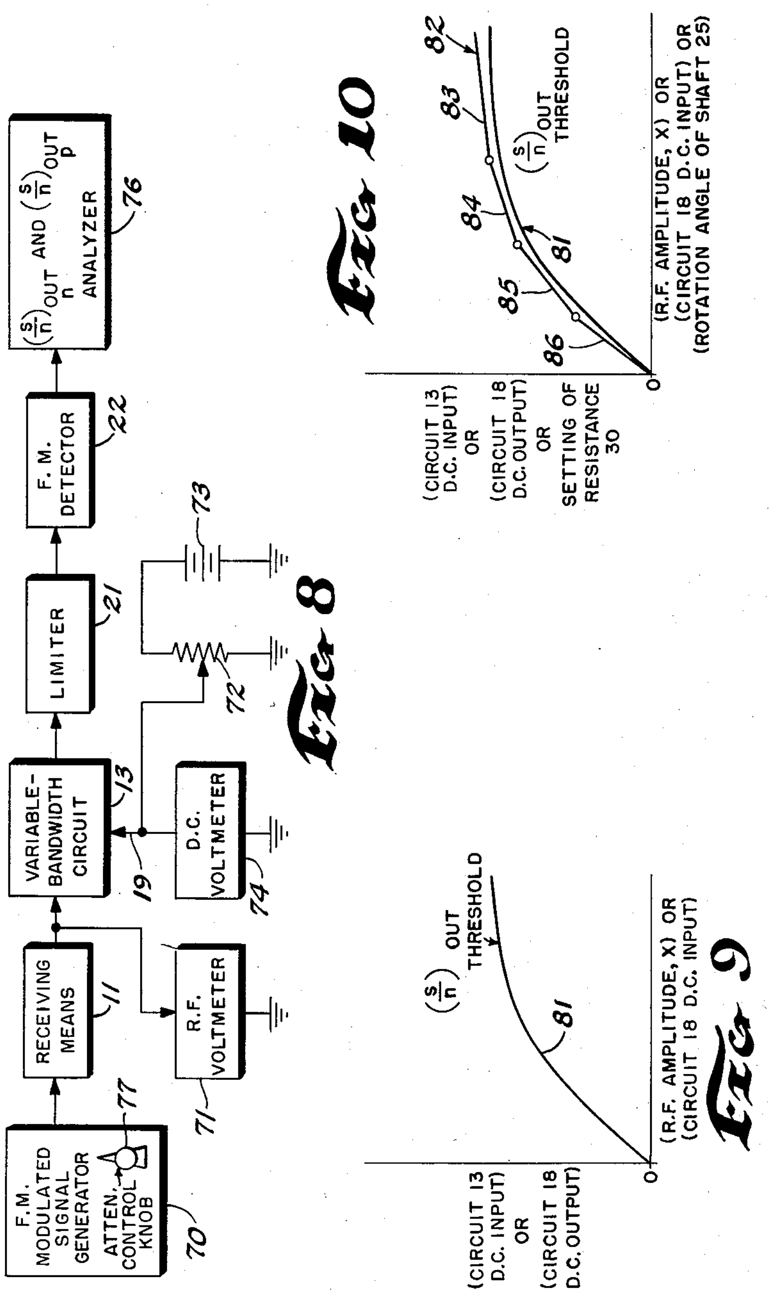
Figure 8 illustrates a test arrangement for determining the threshold-control characteristics used with the invention.
Figures 9 through 14 illustrate diagrams used in explaining the invention.

The nonlinear variation between the control current and input-signal amplitude in Figure 5 is also due to the fact that bandwidth is inversely proportional to transconductance ($g_m$), and the variation of $g_m$ is furthermore a nonlinear function of the tube bias. Hence, it is often preferable to experimentally determine this nonlinear variation for a particular design of variable-bandwidth circuit 13 in a given type of receiver and having a particular tube type. This can be done with the test setup arrangement illustrated in Figure 8. Three parameters are involved, which are: (A) the R.F. input (or output) amplitude to circuit 13, (B) the direct-current control-voltage input to circuit 13, and (C) with the direct-current control input being adjusted to obtain the threshold output signal-to-noise ratio for each R.F. input level. In Figure 8, (A) is determined by R.F. voltmeter 71, (B) by direct-current voltmeter 74, and (C) by signal-to-noise analyzer 76.

Figure 9 illustrates a type of characteristic which can be obtained from a variable-bandwidth circuit 13 by the test system illustrated in Figure 8.

In Figure 8, an F.M. modulated signal generator 70 provides an input signal to receiving means 11. The frequency deviation of the generator signal should be approximately the same as would be actually used with circuit 13. When the signal is passed through initial receiving means 11, internally generated noise will inherently be included with the signal. The reading of R.F. voltmeter 71 is proportional to the R.F. level at the input to receiving means 11, since it has constant gain. An adjustable direct-voltage is obtained from the tap of a potentiometer 72, which is connected across a direct-current voltage source, such as a battery 73. The potentiometer tap is connected to direct-current input lead 19 of circuit 13. Direct-current voltmeter 74 is connected between ground and lead 19 to measure the control-voltage level. An I.F. signal amplitude limiter 21 receives the output of circuit 13 and passes it to an F.M. detector 22, which provides an output that is the same as the modulating signal of generator 70, except for superimposed noise and distortion generated within receiving means 11 and variable-bandwidth circuit 13. A signal-to-noise ratio and distortion analyzer 76 is connected to the output of detector 22 to determine the signal-to-noise and distortion characteristics of the detected signal. Many conventional signal analyzers are available to provide analyzer 76. For example, it can have a sharply-tuned circuit tuned to the modulating-signal frequency to sense the signal, variable-tuned circuits to pick out new frequency components resulting from intermodulation distortion, and can sense the detected over-all signal-plus-noise power. From these, $$\left(\frac{s}{n}\right)_{\text{out}_p}, \left(\frac{s}{n}\right)_{\text{out}_n}$$

and threshold information can be determined. The threshold is sensed by a sharp increase in detected signal level with variation of either the I.F. or direct-current input levels to circuit 13.

An attenuator knob 77 of generator 70 varies the level of the receiver-input signal, X, which is sensed by voltmeter 71. A desirable procedure is to initially adjust the direct-current input to circuit 13 for maximum bandwidth, and then to slowly reduce receiver-input level X by attenuator knob 77. The normal-threshold level, $X_0$, will be reached when the signal level sensed by analyzer 76 sharply drops off. Hence, the reading of analyzer 76 just before the sharp drop of output signal determines the normal input threshold, $X_0$, of the F.M. receiver system to provide a single point on curve 81 in Figure 9.

The generator output is then attenuated to a level somewhat below the normal threshold; and the direct-current input is adjusted by moving the tap of potentiometer 72 until analyzer 76 indicates a threshold condition. Thus, the instruments then provide a second point on curve 81 of Figure 9.

This operation is repeated for as many input levels, X, as is needed to define curve 81, thus providing an experimental determination of it.

Simultaneously with the finding of each point on curve 81, there is also found both component signal-to-noise ratios $$\left(\frac{s}{n}\right)_{\text{out}_n} \text{ and } \left(\frac{s}{n}\right)_{\text{out}_p}$$

which are respectively used to plot the curves 31 and 32 in Figure 13, which are also a function of input-signal level. In an optimum situation, the direct-current control input of any variable-bandwidth circuit 13 would precisely follow curve 81 in Figure 9. However, certain instabilities may be involved to slightly deteriorate their operation. Thus, at any receiver input level, X, it becomes necessary to have the control current differ from the optimum value determined by curve 81 by an amount sufficient to insure that instability variations of it will not cause the bandwidth to increase and prevent capture of the signal. In the particular case of the circuit in Figure 5, the transconductances ($g_m$) may be slightly unstable due to aging or may vary somewhat due to tube changes. Consequently, in such case, the direct-current input should provide a slightly narrower bandpass than optimum from a distortion viewpoint to insure that instabilities will never cause the bandpass to increase beyond the point where the input-signal level falls below threshold. As explained above with Expression 5, making the bandpass narrower than required for a given signal level, X, does not affect $$\left(\frac{s}{n}\right)_{\text{out}_n}$$

but only affects $$\left(\frac{s}{n}\right)_{\text{out}_p}$$

The output level of amplitude detector 16 in Figures 1, 2 and 3 is linear proportional to the radio-frequency amplitude, if a linear detector is used. However, control voltage derived therefrom to control variable-bandwidth circuit 13 in nonlinear in the manner described with Figure 9. It is therefore obvious that the direct-current voltage at the output of filter 17 will not meet the requirements of a curve such as 81 in Figure 9. Consequently, direct-current shaping circuit 18 in each of Figures 1, 2 and 4 is provided to obtain the proper nonlinearity of control-voltage amplitude variation as a function of the detected amplitude. As stated above, such a nonlinear direct-current shaping circuit can be simply made from diodes and resistors. This is done by providing a number of resistors connected either in series or parallel, with a respective diode connected in series or parallel with each resistor. The respective diodes are biased to the direct-current voltage at which it is desired for their respective resistors to begin operation. Thus, as its bias voltage is reached by the direct-current input, each diode either shunts-out or open-circuits its respective resistor to cause incremental nonlinear changes in the output resistance of the shaping circuit. In this manner almost any type of nonlinear direct-current amplitude response can be obtained.

A typical output response curve for direct-current shaping circuit 18 is given by the broken-line curve 82 in Figure 10 which consists of broken-line portions 83, 84, 85 and 86. Note that broken-line curve 82 is positioned slightly above curve 81 so that at all times the direct-current control voltage provided by shaping circuit 18 is slightly greater than the optimum direct-current voltage specified by curve 81, in order to compensate for any instabilities in the particular circuit of Figure 5.

Figure 6:
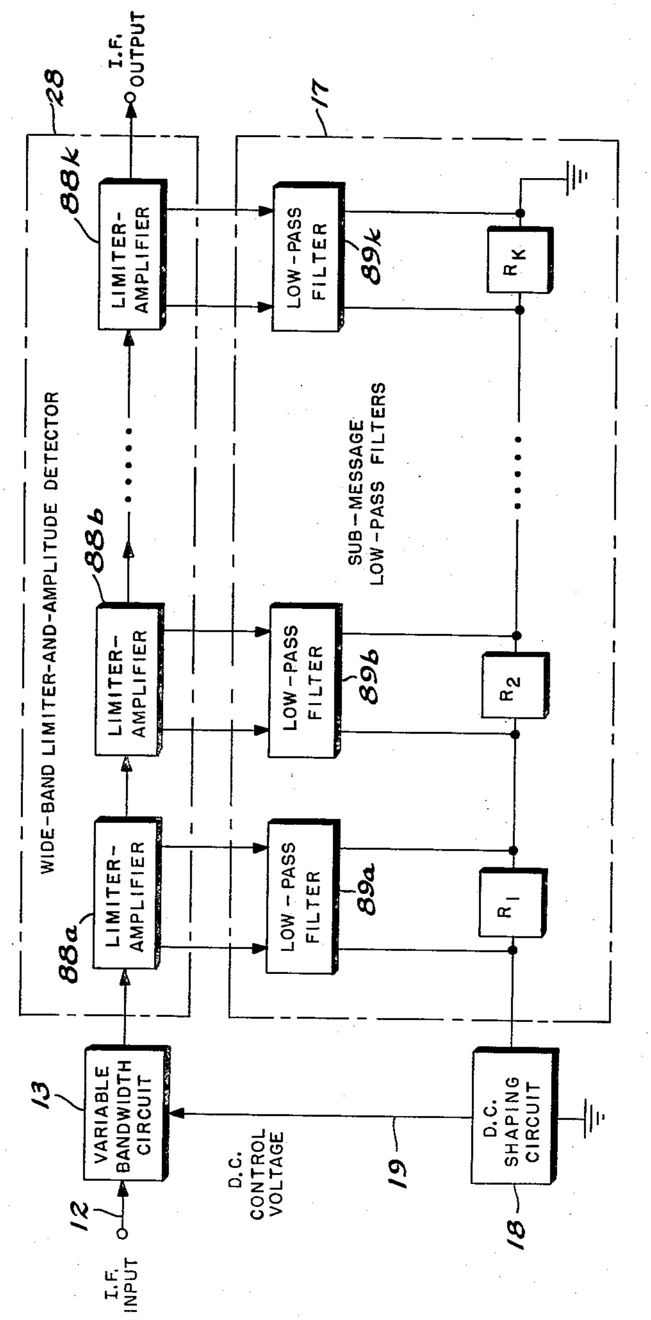
Figure 6 illustrates detailed portions for the system of Figure 4.

Figure 6 illustrates in schematic detail another form of the invention. In Figure 6, limiter-and-amplifier detector 28 is comprised of a plurality of limiter amplifiers 88*a*, 88*b* through 88*k*, which respectively are the conventional grid-leak limited type of circuit commonly found in F.M. receivers. However, each limiter-amplifier 88 is arranged to provide two outputs; one is the peak limited R.F. signal which is passed on to the F.M. detector, and the other output is the grid-leak signal which is proportional to the clipped-peak portions of the waves and accordingly varies with the receiver-input level, X. The output is provided with a floating-potential level as it is passed through filter circuit 17, which is comprised of respective low-pass filters 89*a*, 89*b* through 89*k*. Each of low-pass filters has a cutoff frequency as explained above in connection with filter 17.

The outputs of the respective filters 89 in Figure 6 are provided across series-connected resistance circuits $R_1$, $R_2$ through $R_k$, which are connected in series between ground and direct-current shaping circuit 18. Thus, the output potential level from any low-pass filter 89 is established by its connection to one of the respective resistance circuits R, because previously their potential reference was floating. Thus, at high input R.F. signal levels, all of the limiter-amplifiers 88 will be providing an output voltage across their respective nonlinear resistance means $R_1$ through $R_k$. As the R.F. signal level decreases very near to the normal-threshold level, $X_0$, the first limited-amplifier 88*a* will not be driven hard enough to do any clipping; and consequently will not provide any output through its low-pass filter 89 to its resistance circuit $R_1$. It will then change from a voltage source to a load on the remaining voltage sources. At the lowest signal level, there will only be provided a control voltage from the last low-pass filter 89*k*. The angularly-modulated signal is not detectable when no control output is provided, because then no amplitude limiting is being obtained and the signal-to-noise ratio drops below threshold.

Figure 15:
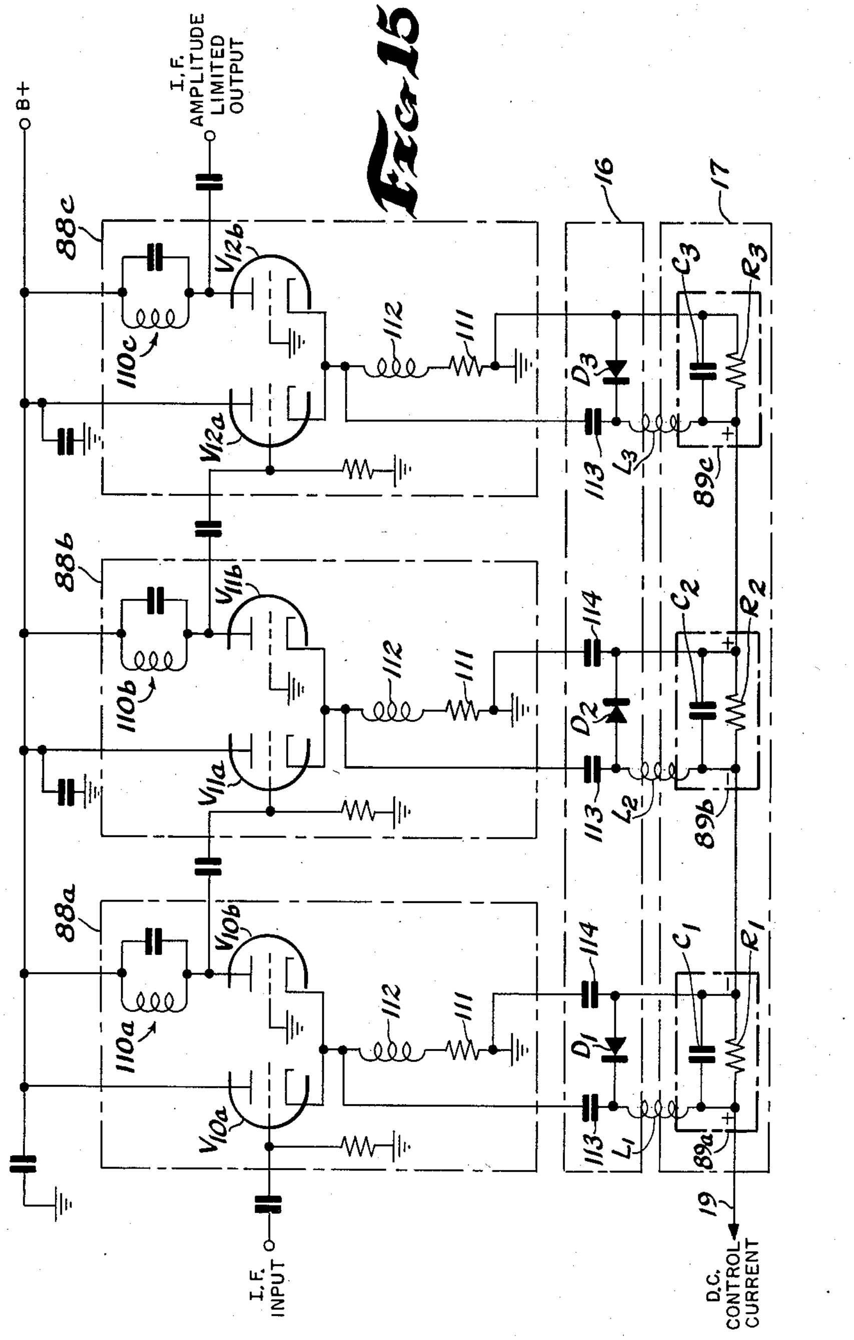
Figure 15 is a schematic illustrating in detail of elements found in Figure 6.

Figure 15 is a schematic diagram of a form of the invention. It is basically comprehended by the system of Figure 6; however, in Figure 15, direct-current shaping circuit 18 is eliminated as a separate entity, but its function is obtained by controlling the polarities and amplitudes of the respective outputs from low-pass filters 89. In Figure 15, limiter-amplifiers 88*a*, *b* and *c* are also of conventional type and are described in "Proceedings of the I.R.E." October 1945, pages 701–709. Each limiter includes a pair of tubes comprising a dual-triode $V_{10}$, $V_{11}$ or $V_{12}$. The first tube-half is connected as a cathode follower, and the second tube-half is connected as a grounded-grid amplifier. A tank circuit 110 is connected in the plate circuit of the second half of each tube and is tuned to the intermediate frequency. The two halves of each dual triode are cathode coupled by means of series-connected resistor 111 and inductor 112, between cathode and ground. Diodes $D_1$, $D_2$, and $D_3$ are respectively connected across the cathode circuits of the respective limiters by means of blocking capacitors 113 and 114, which connect each diode across a respective cathode circuit. The blocking capacitors about each diode enable a floating potential level for the direct-current output, except from diode $D_3$ which has one end grounded. Either direct-current polarity can be obtained for the detector by this arrangement; thus, the opposite polarity may be obtained merely by reversing the anode and cathode positions of any diode. Low-pass filters 89 are comprised of a capacitor $C_1$, $C_2$, or $C_3$ and a resistor $R_1$, $R_2$, or $R_3$ respectively connected across respective diodes through a choke coil $L_1$, $L_2$ or $L_3$. The resistors $R_1$, $R_2$, and $R_3$ are connected in series with the outer end of $R_3$ connected to ground. Accordingly, the floating potential levels of filters 89 are determined by the series connections of their resistors. A control current for operating the variable bandwidth circuit is obtained from the terminal 120. A direct-current shaping circuit is not needed as a special entity in Figure 15, because direct-current shaping is obtainable by controlling the respective polarities of the output currents from low-pass filters 89. Thus, some of the detected outputs are made additive and others can be made subtractive by choosing an opposite polarity for the diodes of the subtractive ones. In Figure 15, diodes $D_3$ and $D_1$ provide a positive-polarity output, while diode $D_2$ provides a negative-polarity output. Thus, the over-all output is accordingly controlled in a nonlinear manner, as required. The control-current response for a given variable-bandwidth circuit 13 is determined by the test procedure taught in regard to Figure 8.

Figure 7:
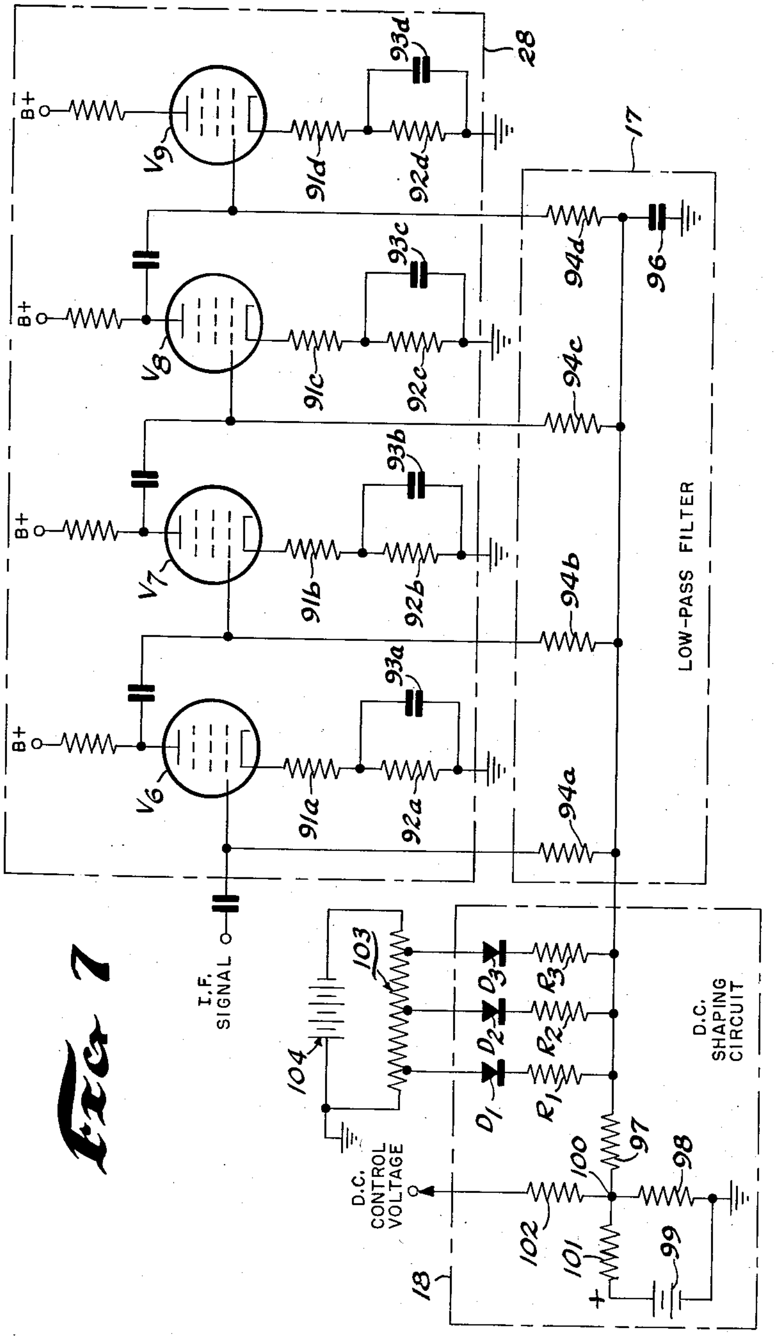
Figure 7 shows in more detail a circuit illustrative of elements in Figure 6.

Figure 7 illustrates another detailed arrangement of a limiter-amplifier circuit. It comprises a plurality of tubes $V_6$, $V_7$, $V_8$ and $V_9$. Each tube has its plate connected to a B plus source, and has a pair of resistors 91 and 92 connected in series between its cathode and ground. A bypassing capacitor 93 is connected across each resistor 92 so that resistor 92 controls a direct-current voltage level. Whenever the R.F. input to the control grid of any tube $V_6$ through $V_9$ exceeds the bias set by its resistor 92, clipping is caused. That is, whenever this bias level is exceeded, the grid voltage goes positive to cause grid current that indicates clipping of the signal. Thus, the clipped peak portions of the signal pass through a grid-leak resistor 94 to charge a capacitor 96, which together have a long time-constant to provide a low-pass filter 17.

Resistors 92*a* through 92*d* respectively decrease in value so as to provide sequentially different biasing levers for their tubes. Thus, the signal will first be clipped by tube $V_9$ due to the amplification of the prior limiter tubes; then $V_8$, $V_7$ and $V_6$ will clip in that order as the signal level is increased.

Shaping circuit 18 in Figure 7 is comprised of a plurality of resistors $R_1$, $R_2$ and $R_3$ connected in shunt with capacitor 96. Diodes $D_1$, $D_2$ and $D_3$ are respectively serially connected to the resistors. Different negative-bias levels are established on the diodes by connecting their anodes to different points on a voltage divider 103 connected across a battery 104 having its positive end grounded. Resistors $R_1$ through $R_3$ are operated nonlinearly by their diodes to control the shunting of current from low-pass filter 17. At very low signal levels, all diodes are below cutoff and their resistors cannot shunt any current, which then entirely passes through a voltage divider comprising resistors 97 and 98. A direct-current bias source, illustrated as battery 99, is connected serially to resistor 98 through a resistor 101. An isolation resistor 102 is connected to point 100 on the divider and provides the direct-current control voltage output from the shaping circuit. Battery 99 provides a positive current through resistor 98 that is greater than the range of current from the shaping circuit, and therefore causes an inversion in the polarity direction of the filter-circuit output. Hence, a negative-going change in the filter output causes a positive-going change in the control voltage. Also, the level of the control voltage can be adjusted by controlling the value of resistor 101.

On the other hand, when the filter output is large, the negative voltage across capacitor 96 is large and all diodes $D_1$, $D_2$ and $D_3$ are closed to have their resistors all shunt current to ground. The shunted current does not reach resistor 98 to affect the control voltage. The parallel value of resistors $R_1$, $R_2$ and $R_3$ determines their maximum shunt value. When the detected level drops below the bias established on diode $D_3$ by its connection to divider 103, resistor $R_3$ loses its shunting effect; and the remaining shunt current is determined by the parallel value of resistors $R_1$ and $R_2$. When the signal level drops further, only $D_1$ will be above cutoff and only resistor $R_1$ is effective; and at still lower signal levels all the diodes are open, as mentioned above, and all existing filter current passes through resistor 98.

Broken-line curve 82 in Figure 10 illustrates the shaping effect with the circuit of Figure 7. The last broken-line portion 83 of broken-line curve 82 is provided when a large filter output is provided which causes all diodes to be closed, enabling all resistors $R_1$, $R_2$ and $R_3$ to shunt current. Broken-line portion 84 is provided when at lower signal levels, only diodes $D_1$ and $D_2$ are closed; broken-line portion 85 when only the last diode $D_1$ is closed; and the last broken-line portion 86 when none of the diodes are closed and no current is shunted by $R_1$, $R_2$ or $R_3$.

While receiving very low input signal levels, with which the automatic-bandwidth-control feature of the invention is used, automatic gain control (AGC) is not desirable with the angular-modulation receiver, because amplitude sensing during the bandwidth-varying period requires a fixed gain between the receiver input and the amplitude detector. However, delayed automatic-gain control is compatible with the invention, provided that the delay amplitude (the amplitude at which AGC begins) occurs at a level which occurs when the normal-receiver-input-threshold level is exceeded. Such delayed automatic-gain control relieves the amplitude-limited during very large input signal conditions.

Where receivers utilizing the invention are intended for use only with relatively low amplitude signals, automatic-gain control is generally unnecessary. If automatic-gain control is used simultaneously with the automatic-bandwidth control feature of this invention, nonlinear direct-current shaping circuit 13 must take into account the additional effect of automatic-gain control variations of the signal prior to amplitude sensing, in order to properly control the bandwidth variation; and where this is done, the test circuit of Figure 8 must simultaneously have such AGC of the receiver in operation, in order to obtain proper calibration for bandwidth variation by circuit 13.

Once an understanding of the method of this invention is learned from this specification by one skilled in the art, various forms of the invention, too numerous to be given in detail herein without unduly expanding the wordage of this specification, will be obvious to such skilled person. For example, a two-state switched I.F. bandwidth having a normal maximum state and a minimum state could be used, with the minimum state being provided when the signal decreases below the normal-input threshold, $X_0$. Other examples are receivers having their bandwidth controlled by the R.F. (I.F.) power level by means of temperature-stabilized current or temperature-sensitive resistance devices, such as temperature-varying resistors, thermistors or varistors. In one form, the signal power in an I.F. resonant-circuit directly controls the temperature of such resistance device directly placed in such circuit, and thereby controls the circuit bandpass in proper nonlinear relationship to the amplitude of the signal current. In another form, the temperature of such resistance devices can be varied by temperature-control means external to the devices which are operated by the output of filter 17.

Hence, although this invention has been described with respect to particular forms thereof, it is not to be so limited as changes and modifications may be made therein which are within the full-intended scope of the invention as defined by the appended claims.

I claim:

1. A threshold control system in a receiver of angularly-modulated signals comprising, a variable-bandpass circuit for passing said angularly-modulated signals, means for detecting amplitude variations of said signals, low-pass filtering means receiving the output of said detecting means and selectively passing frequencies below message frequencies of said signal, means for shaping the amplitude of the output of said low-pass filtering means according to the angular-modulation threshold of said signal, and means for decreasing and increasing the bandpass of said variable-bandpass circuit in response to the output of said shaping means.

2. A threshold control system for a receiver of angularly-modulated signals, comprising a variable-bandwidth intermediate-frequency circuit for selecting said angularly-modulated signal, amplitude-limiting means receiving the output of said variable-bandwidth circuit, amplitude-detection means connected to said variable-bandwidth circuit for detecting the amplitude of said signals, a low-pass filter connected to the output of said amplitude detector and having a cutoff frequency below the message frequencies of said detected signal, a signal-shaping device connected to the output of said low-pass filter with a shaping factor following the angular-modulation thresholds of received signals, means for controlling the bandwidth of said variable-bandwidth circuit in response of the output of said shaping device, with said control means changing the bandwidth of said variable-bandwidth circuit to prevent angular-modulation receiver dropout when the received signal falls below a normal angular-modulation threshold.

3. A threshold control system for a receiver of angularly-modulated signals as defined in claim 2 further comprising, said amplitude-detector being connected to the output of said variable-bandwidth circuit, and said control means including a direct-current nonlinear shaping circuit, and said variable-bandwidth circuit being electronically controlled by the output of said shaping circuit.

4. A threshold control system for a receiver of angularly-modulated signals as defined in claim 2 in which said amplitude-detector is connected to the input of said variable-bandwidth circuit, and said control means comprises a direct-current shaping circuit for nonlinearly varying the output of said filter, said variable-bandwidth circuit having a control input connected to the output of said shaping circuit, the bandwidth of said variable-bandwidth circuit being regulated below normal threshold value by said control input, and means for limiting the amplitude of said signals prior to angular-modulation detection.

5. A threshold control system for a receiver of angularly-modulated signals, comprising a variable-bandwidth frequency circuit for selecting at least part of said angularly-modulated signal, a pre-detection amplitude-limiter provided after said variable-bandwidth circuit and receiving its output, said amplitude-limiter also detecting amplitude variations of said angularly-modulated signal, a submessage low-pass filter receiving the amplitude-varying output of said amplitude-limiter, a direct-current shaping circuit connected to the output of said filter, a control input of said variable-bandwidth circuit receiving the output of said shaping circuit, the output of said shaping circuit regulating the bandwidth (B) according to the expression:

$$B=\frac{1}{KTF_nH}X_1$$

where K is Boltzmann's constant, T is absolute temperature, $F_n$ is the receiver's noise-figure ratio, H is the limiter-threshold level, and $X_1$ is the instantaneous receiver-input-threshold level when below its normal-threshold level.

6. A threshold control system for a receiver of angularly-modulated signals, comprising a variable-bandwidth intermediate-frequency circuit for selecting at least a portion of said angularly-modulated signals, a pre-detection amplitude-limiter provided in series with said variable-bandwidth circuit, means for detecting the amplitude of said received angularly-modulated signals, a sub-message low-pass filter connected to the output of said amplitude-detection means, a restrained motor receiving the output of said filter, with the output shaft of said motor having an angular position proportional to the low-pass filter output, variable-resistance means being included in said variable-bandwidth circuit to control its bandwidth, the output shaft of said motor being connected to said variable-resistance means, said variable-resistance means being nonlinear in its variation to provide optimum threshold response.

7. An automatic-bandwidth control circuit in a receiver of angularly-modulated signals, comprising at least one electron-control device having plural electrodes, and having its gain variable with the direct-voltage applied to one of its electrodes, said electron-control device being connected in a cathode-follower arrangement, with a resonant circuit connected to the load of said arrangement, an amplitude-detector connected to said receiver to sense amplitude variations of said received angularly-modulated signal, a low-pass filter connected to the output of said amplitude-detector, a nonlinear amplitude shaping circuit connected to the output of said low-pass filter to shape a received output as a function of the angular-modulation thresholds of said signals, and the output of said shaping circuit being connected to said one electrode.

8. In a threshold-controlled receiver of angularly-modulated signals, an automatic-bandwidth control circuit comprising a plurality of cathode-follower-connected vacuum tubes coupled in tandem, a plurality of parallel-resonant circuits respectively connected as respective loads of said tubes, each tube having an electrode where a variable direct-voltage causes variation of its transconductance; an amplitude-limiter connected in series with said automatic-bandwidth control circuit to capture said signals, amplitude-detecting means associated with said limiter to sense the amplitude of said signals at said receiver input, a low-pass filtering means connected to the output of said detecting means to provide a direct-current output, means for shaping said direct-current output connecting the output of said filtering means to said electrode of each tube to logarithmically vary said bandpass with submodulation amplitude changes of said signal.

9. In a threshold-controlled receiver of angularly-modulated signals as defined in claim 8 in which said amplitude-limiter comprises a plurality of limiter circuits connected in tandem, each comprising first and second tubes, with the first being connected as a cathode follower, the second being connected as a grounded-grid amplifier, and cathode impedances coupling the cathodes of both of said tubes; said amplitude-detecting means comprising a plurality of asymmetric conductors, a plurality of blocking capacitors coupling said asymmetric conductors respectively across said cathode impedances to enable a floating potential level for said asymmetric-conductor outputs; said low-pass filtering means comprising a plurality of parallel resistance-capacitor circuits respectively connected to said asymmetric conductors, and said resistance-capacitance circuits being connected in series with each other and to said electrode of each tube; and said means for shaping comprising polarity connections of said asymmetric conductors and relative proportions for the resistances in said resistance-capacitance circuits.

10. A threshold control system in a receiver of angularly-modulated signals comprising a variable-bandpass circuit for passing said angular-modulated signals, means for detecting amplitude variations of said signals, low-pass filtering means receiving the output of said detecting means and selectively passing amplitude-detected frequencies below message frequencies of said signals, means for shaping the amplitude-detected output of said low-pass filtering means according to predetermined angular-modulation threshold variations of said signals, said shaping means being operative for received signals at and below a normal threshold of said angular-modulation receiver, and means for varying the bandpass of said variable-bandpass circuit in response to the amplitude-detected output of said shaping means.

References Cited in the file of this patent

UNITED STATES PATENTS

| | | |
|---|---|---|
| 1,803,504 | Hansell | May 5, 1931 |
| 2,037,498 | Clay | Apr. 14, 1936 |
| 2,261,374 | Koch | Nov. 4, 1941 |
| 2,280,563 | Weinberger | Apr. 21, 1942 |
| 2,318,137 | Armstrong | May 4, 1943 |
| 2,388,544 | Holst | Nov. 6, 1945 |
| 2,715,180 | Beers | Aug. 9, 1955 |
| 2,794,909 | Berg | June 4, 1957 |